(12) United States Patent
Ziegerer et al.

(10) Patent No.: US 6,471,378 B1
(45) Date of Patent: Oct. 29, 2002

(54) ORIENTATION ILLUMINATION IN A MOTOR VEHICLE

(75) Inventors: Michael Ziegerer, Althengstett; Stefan Eberhardt, Backnang, both of (DE)

(73) Assignee: Ing. h.c.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 09/658,995

(22) Filed: Sep. 11, 2000

(30) Foreign Application Priority Data

Sep. 11, 1999 (DE) .......................................... 199 43 533
Dec. 15, 1999 (DE) .......................................... 199 60 434

(51) Int. Cl.⁷ ................................................. B60Q 3/02
(52) U.S. Cl. ...................... 362/490; 362/549; 362/359; 362/361
(58) Field of Search ................................. 362/490, 543, 362/544, 545, 509, 351, 323, 359, 362, 488

(56) References Cited

U.S. PATENT DOCUMENTS

| | | | | |
|---|---|---|---|---|
| 4,298,912 A | * | 11/1981 | Dearth | 362/277 |
| 4,519,018 A | * | 5/1985 | Rowland | 362/280 |
| 4,584,631 A | * | 4/1986 | Cody et al. | 362/302 |
| 4,628,417 A | * | 12/1986 | Kaminski et al. | 362/427 |
| 6,203,180 B1 | * | 3/2001 | Fleischmann | 362/471 |
| 6,283,621 B1 | * | 9/2001 | Macri | 362/490 |

* cited by examiner

Primary Examiner—Thomas M. Sember
(74) Attorney, Agent, or Firm—Crowell & Moring LLP

(57) ABSTRACT

An orientation illumination for motor vehicles is provided which, for illuminating a center console, is integrated in an area of a vehicle ceiling. Correspondingly mounted shields are located and shaped such that the vehicle occupants can have no direct viewing contact with the light source, whereby the light source is blocked for the vehicle occupants without blinding them.

12 Claims, 2 Drawing Sheets

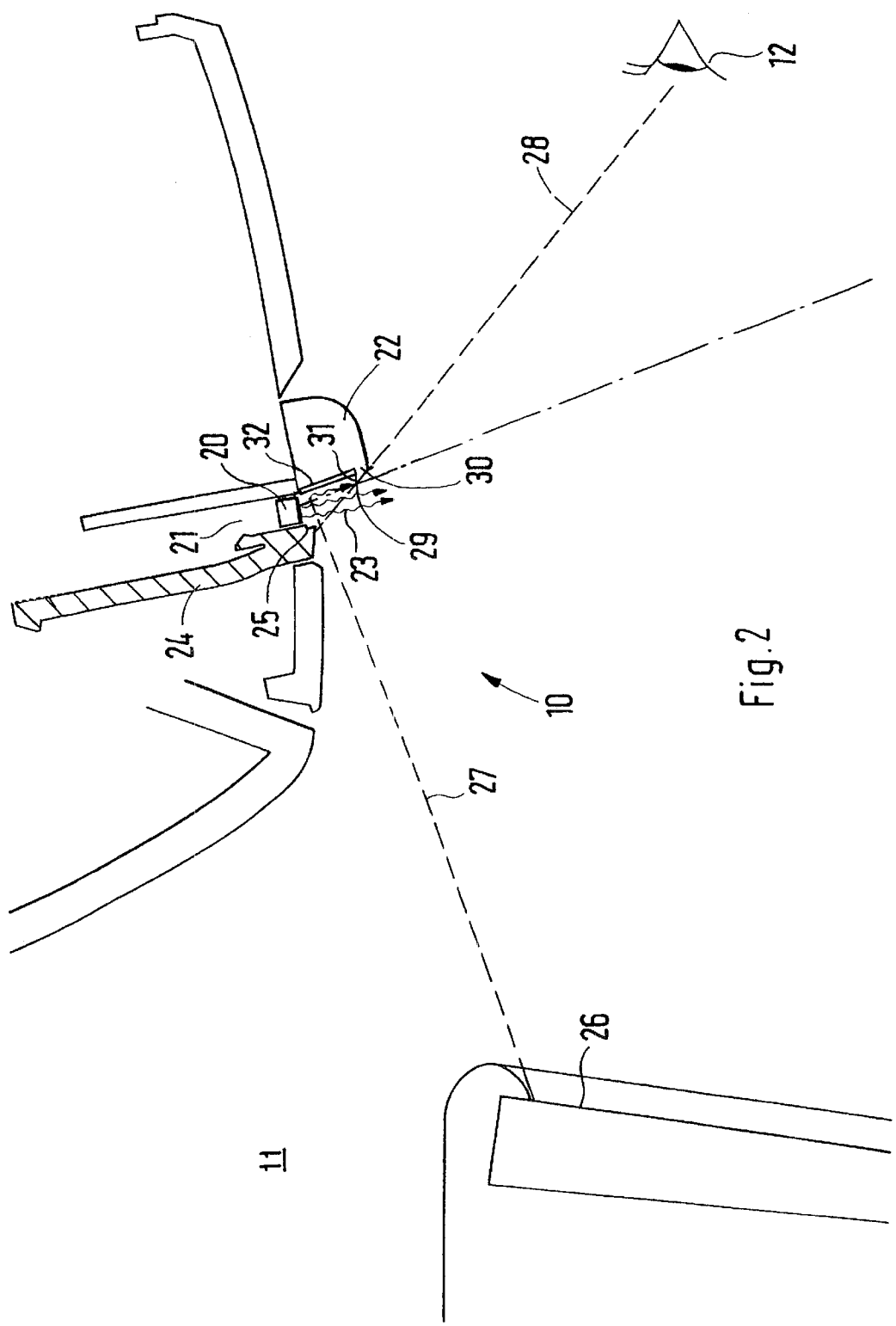

ORIENTATION ILLUMINATION IN A MOTOR VEHICLE

BACKGROUND AND SUMMARY OF THE INVENTION

This application claims the priority of German patent document 199 43 533.2, filed Sep. 11, 1999, and German patent document 199 60 434.7, filed Dec. 15, 1999, the disclosures of which are expressly incorporated by reference herein.

The invention relates to an orientation illumination in a motor vehicle. In modern vehicles, a number of operating elements and depositing possibilities are integrated in the center console which, unless they carry an active illumination unit themselves, are difficult to recognize for the driver in the dark. Illumination units integrated in the ceiling are known which can optionally be switched on or off by the driver or front passenger, so that, as required, the center console is illuminated correspondingly. As an orientation illumination, small light sources are installed, for example, in the form of light-emitting diodes or lightwave outputs. The light emitted here is frequently visible by reflection on the environment of the light source, which may have a blinding effect on the vehicle occupants.

In the case of the suggested orientation illumination according to the invention, the light source, which, for illuminating the driver seat and front passenger seat as well as the center console, is integrated in the area of the vehicle ceiling, is not visible so that the occupants can neither be irritated nor blinded.

In certain preferred embodiments of the invention, the arrangement of the orientation illumination in the existing illumination unit at the vehicle ceiling has the advantage that electric contacts are already arranged and no constructive change of the electric lines or even additional lines have to be provided. The different characteristics according to the invention ensure that light sources, although arranged in the viewing area of the vehicle occupants, radiate the light without a blinding effect.

The providing of a shield with a curved contour having a recess and two convexities according to certain preferred embodiments of the invention has the advantage that, as a result of the recess in the shield, the center console is illuminated well, while, as a result of the two convexities, the driver and the front passenger have no direct viewing contact with the light source.

Another advantage is obtained by the reflective coating of an interior surface of a central shield according to certain preferred embodiments of the invention because rays of light which impinge on the reflective coating are not visible as a result of the reflection and even an indirect blinding of the vehicle occupants by way of the interior rear view mirror or for the oncoming traffic cannot occur.

By means of the shields, the shape of the illumination can also be defined and, as desired, a wide illumination cone or a narrow illumination cone can be implemented.

Other objects, advantages and novel features of the present invention will become apparent from the following detailed description of the invention when considered in conjunction with the accompanying drawings.

BRIEF DESCRIPTION OF THE DRAWINGS

FIG. 2 is a partially sectional view of the orientation illumination.

DETAILED DESCRIPTION OF THE DRAWINGS

Figure 1:
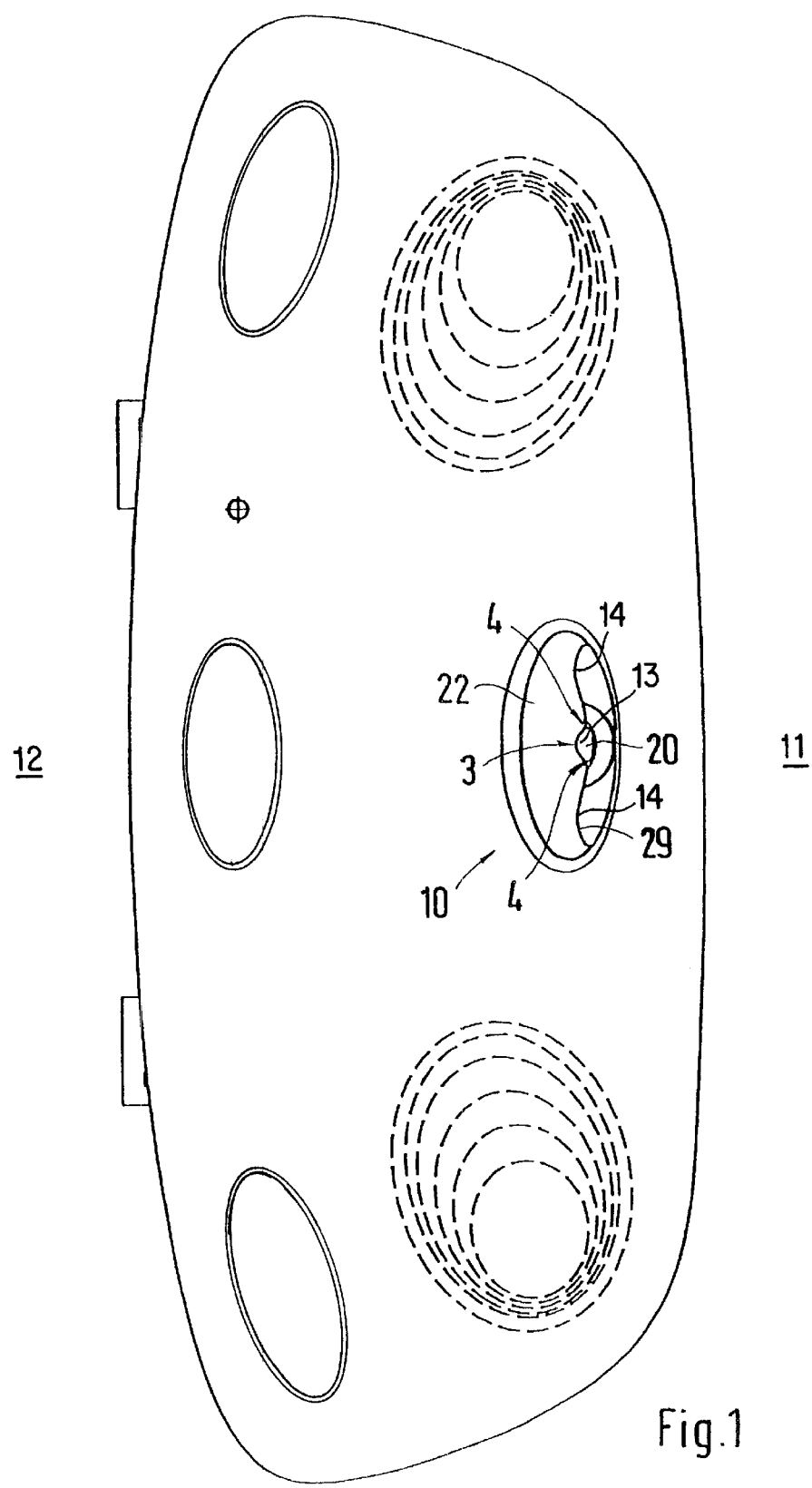
FIG. 1 is a schematic view of a constructional unit for illumination of a vehicle interior with an integrated orientation illumination, constructed according to a preferred embodiment of the invention.

FIG. 1 illustrates a constructional unit for illuminating a vehicle interior with various illumination units, such as a reading light, an entering and exiting light and an integrated orientation illumination 10 which can be turned on and off, the orientation illumination 10 being arranged here in the center on the side of the illumination unit assigned to the windshield 11.

The construction and method of operation of the orientation illumination 10 will be explained by means of FIG. 2. FIG. 2 is a partially sectional view of the orientation illumination 10, the reference number 11 symbolically showing the windshield, and the reference number 12 symbolically indicating the driver or the vehicle occupants. The light source of the orientation light 10 is a light-emitting diode 20 which is arranged in a slightly set-back manner in a mounting shaft 21 and, with respect to the occupants, is covered by a first half-shell-shaped shield 22. As a result of the set-back arranging of the light-emitting diode 20 in the mounting shaft 21, the surfaces surrounding the light-emitting diode 20 are not illuminated, whereby they are also not visible to a viewer. The light emitted by the light-emitting diode 20 is symbolically indicated in FIG. 2 by wavy lines 23. On the side facing the windshield 11, the mounting shaft 21 is bounded by a second shield 24 which projects beyond the light-emitting diode 20.

The second shield 24 projects so far beyond the light-emitting diode 20 so that the light-emitting diode is not visible to the occupants even in an indirect viewing direction 27 by way of an inside rear view mirror 26. By means of a broken line 27, FIG. 2 shows the indirect viewing direction which occurs as a result of the existing inside rear view mirror 26. As illustrated in FIG. 2, as a result of the second shield 24, the light-emitting diode is also not visible to the driver from this direction.

The section of the second shield 24 which projects beyond the light-emitting diode 20 may optionally have a recess 25, as illustrated in FIG. 2. The recess 25—in this case, the wall thickness of the second shield 24 being reduced in the area, is dimensioned and arranged such that the light emitted by the light-emitting diode and thus the rays of light 23 do not impinge on the second shield 24. This recess 25 can be eliminated if the first shield 22 is dimensioned such that the critical area of the second shield 24 and the light-emitting diode 20 are visible to the occupants neither in the direct viewing direction 28, nor in the indirect viewing direction 27.

The first half-shell-shaped shield 22 is designed such that the light source 20 is not visible to the occupants whose direct viewing direction is indicated by the broken line 28. For an optimal shielding of the light-emitting diode for avoiding a direct viewing contact by the driver with the light source and simultaneously for a sufficient illumination, the shell-shaped first shield 22 is correspondingly developed in the area of the edge 29 pointing away or facing away from the vehicle occupants. The edge 29 has a tapering design and will be called a point 30 in the following. The point 30 ensures that, independently of the size of the driver or front passenger, the light-emitting diode 20 will not be directly visible. In the cross-sectional view, the edge 29 with the point 30 can be easily recognized, and it is demonstrated that the light of the light-emitting diode 20 shines only onto the side 31 of the point 30 facing the light-emitting diode 20, which side 31, in turn, is sloped such that is also not visible to the vehicle occupants in the indirect viewing direction.

The interior surface 32, which is not directly visible to the vehicle occupant and is sloped in the direction of the indirect viewing direction, is provided with a reflective coating, in which case mirror glass can be used here, or this interior surface 32 is provided with a reflective coating by means of a reflective foil. As a result of the reflective coating of the interior surface 32, light, which impinges on this interior surface from the light-emitting diode 20, is not visible here and remains invisible to the occupant of the vehicle and can be used for an additional illumination. The interior surface 32 provided with the reflective coating is also not visible to the vehicle occupants by the indirect viewing contact 27, because the reflection angle of the visible rays shows the interior surface 32 with the reflective coating only as a dark surface.

Finally, by means of FIG. 1, the edge 29 of the first shell-shaped shield 22 which faces away from the vehicle occupants will be described in detail. FIG. 1 shows that the forward edge 29 has a curved contour which has a type of recess 13 in the center area. This recess 13 provides an optimal illumination of the center console because the light of the light-emitting diode 22 can better exit here in the downward direction. On both sides of these recesses 13, the contour of the forward edge 29 is pulled toward the front so that two arcs 14 are formed. This arrangement of recesses 13 and 14 provides the illumination of the center console while simultaneously shielding the driver and the front passenger.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Orientation illumination for a vehicle, which is integrated in a form of a light source of a light-emitting diode in a ceiling of a vehicle and which is not directly visible to vehicle occupants as a result of shields and a corresponding arrangement of said shields, comprising a half-shell-shaped shield being arranged on a side of the orientation illumination facing the vehicle occupants, said half-shell-shaped shield tapering to a point on an edge pointing away from the vehicle occupants,
   wherein the light-emitting diode is inserted in a mounting shaft in a slightly set-back manner, and on the side facing away from the vehicle occupants, the mounting shaft is pulled forward to form a shield with respect to the light-emitting diode to such an extent that the light-emitting diode does not reflect in an inside rear view mirror and therefore no indirect viewing contact by the vehicle occupants exists with the light-emitting diode.

2. Orientation illumination according to claim 1, wherein the edge has a curved contour which includes at least a recess and two pulled-forward arcs.

3. Orientation illumination according to claim 2, wherein the half-shell-shaped shield is provided with a reflective coating on an interior surface facing the light-emitting diode.

4. Orientation illumination according to claim 3, wherein the surface with the reflective coating is produced by a reflective foil.

5. Orientation illumination according to claim 1, wherein the half-shell-shaped shield is provided with a reflective coating on an interior surface facing the light-emitting diode.

6. Orientation illumination according to claim 5, wherein the surface with the reflective coating is produced by a reflective foil.

7. Orientation illumination according to claim 1, wherein a half-shell-shaped shield is provided with a reflective coating on an interior surface facing the light-emitting diode.

8. Orientation illumination according to claim 7, wherein the surface with the reflective coating is produced by a reflective foil.

9. Orientation illumination unit for a vehicle occupant space of a vehicle having a ceiling, a forward facing occupant seat and a windshield in front of the seat below the ceiling, said illumination unit comprising:
   a light-emitting diode disposed in the ceiling, and
   light shields extending from the ceiling inwardly into the occupant space, said light shields being configured to prevent direct viewing of light from the diode by an occupant in a normal position in said seat,
   wherein the light shields include a half-shell-shaped shield arranged on a side of the orientation illumination facing the vehicle occupant, and said half-shell-shaped shield tapers to a point on an edge pointing away from the vehicle occupant, and
   wherein the light-emitting diode is inserted in a mounting shaft in a slightly set-back manner, and on the side facing away from the vehicle occupant, the mounting shaft is pulled forward to form a shield with respect to the lightemitting diode to such an extent that the light-emitting diode does not reflect in an inside rear view mirror and therefore no indirect viewing contact by the vehicle occupants exists with the light-emitting diode.

10. Orientation illumination according to claim 9, wherein the edge has a curved contour which includes at least a recess and two pulled-forward arcs.

11. Orientation illumination according to claim 9, wherein the half-shell-shaped shield is provided with a reflective coating on an interior surface facing the light-emitting diode.

12. Orientation illumination according to claim 11, wherein the surface with the reflective coating is produced by a reflective foil.

* * * * *